(12) United States Patent
Casali et al.

(10) Patent No.: US 6,920,940 B2
(45) Date of Patent: Jul. 26, 2005

(54) HITCH DEVICE FOR ATTACHING FARM IMPLEMENTS TO A TRACTOR

(75) Inventors: Paolo Casali, Moderna (IT); Enrico Sedoni, Moderna (IT); Paul John Brooks, Moderna (IT)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/672,047

(22) Filed: Sep. 26, 2003

(65) Prior Publication Data

US 2004/0188113 A1 Sep. 30, 2004

(30) Foreign Application Priority Data

Sep. 27, 2002 (IT) .................................. B02002A0612

(51) Int. Cl.[7] .......................... B60D 1/46; A01B 63/112
(52) U.S. Cl. ..................................................... 172/439
(58) Field of Search .............................. 172/2, 4, 7–12, 172/439–445, 452–455, 466–473, 663–668, 677–681, 684.5, 776

(56) References Cited

U.S. PATENT DOCUMENTS

| | | | |
|---|---|---|---|
| 3,684,056 A | * | 8/1972 | Penso .......................... 182/19 |
| 3,731,745 A | | 5/1973 | Koch |
| 3,795,415 A | | 3/1974 | Koch et al. |
| 4,702,489 A | | 10/1987 | Erickson |
| 5,401,086 A | * | 3/1995 | Nishikimi et al. ....... 303/116.1 |
| 5,634,779 A | * | 6/1997 | Eysymontt .................. 417/342 |
| 5,880,957 A | * | 3/1999 | Aardema et al. ............. 700/86 |
| 6,218,737 B1 | | 4/2001 | Adamek et al. |
| 2001/0007399 A1 | | 7/2001 | Jung et al. |

FOREIGN PATENT DOCUMENTS

EP          1 403 102 A1     3/2004

\* cited by examiner

Primary Examiner—Christopher J. Novosad
(74) Attorney, Agent, or Firm—John William Stader

(57) ABSTRACT

A farm implement of a tractor is hitched to two lift arms, each of which is moved by a respective actuating cylinder having two chambers connected to a feed circuit supplying a pressurized fluid; the feed circuit having, for each chamber, two feed lines for feeding the fluid to and from the chamber respectively, and four independent valves, each located along one of the feed lines and movable between a closed position and at least one open position respectively closing and opening the relative feed line.

12 Claims, 2 Drawing Sheets

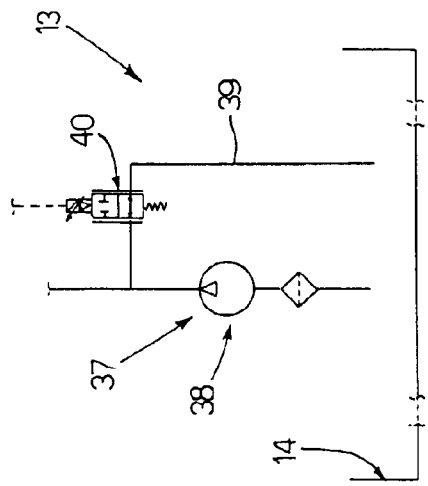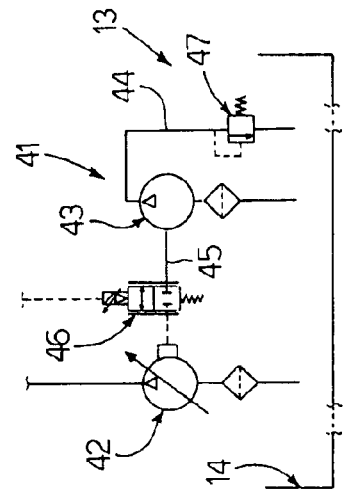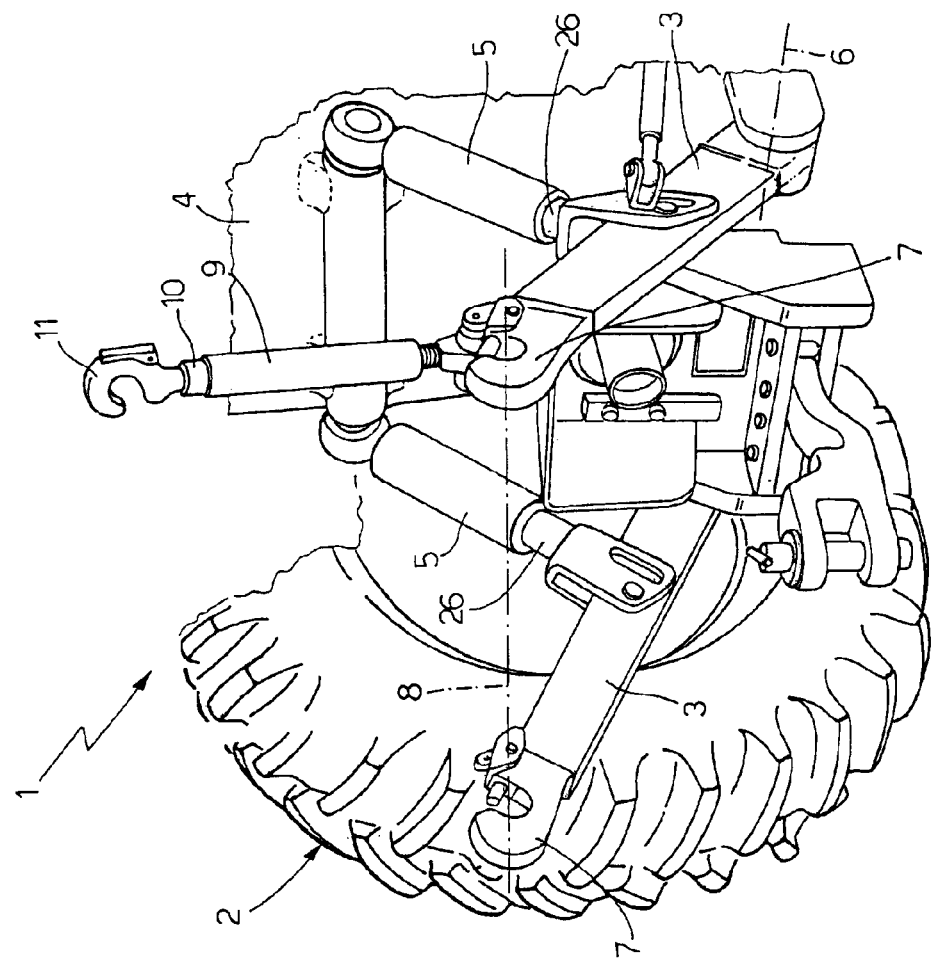

HITCH DEVICE FOR ATTACHING FARM IMPLEMENTS TO A TRACTOR

BACKGROUND OF INVENTION

1. Field of Invention

The present invention relates to a front axle of an agricultural tractor.

2. Background of Prior Art

The present invention relates to a hitch device for attaching farm implements to a tractor.

More specifically, the present invention relates to a so-called "three-point hitch device", to which the following description refers purely by way of example.

In the farm machinery industry, a three-point hitch device is known for attaching farm implements to a tractor, and which normally comprises two bottom lift arms, to which the implement is connected in rotary manner to oscillate about a given hinge axis; and a top actuating cylinder interposed between the tractor frame and the implement to control the angular position of the implement about the hinge axis.

Each lift arm is moved by a further actuating cylinder interposed between the tractor frame and the lift arm itself, and having an output rod defining, inside the further actuating cylinder, two chambers, each of which is connected to a feed line of a hydraulic circuit supplying pressurized fluid to and from the chambers.

The hydraulic circuit comprises a slide valve located along the feed lines and movable selectively between a closed position and three open positions closing and opening the feed lines respectively. In two of the open positions, one of the two feed lines communicates hydraulically with a pump supplying fluid to the relative chamber, and the other communicates hydraulically with a fluid tank; and, in the third open position, both feed lines communicate hydraulically with the tank.

The hydraulic circuit also comprises a lock valve interposed between the feed lines and relative chambers to keep the output rod in a given position when the slide valve is in the closed position.

A major drawback of known hitch devices of the above type is that, when the slide valve is moved to the third open position, the lock valve must be operated to connect both chambers hydraulically to the tank. Moreover, operation of the lock valve is relatively complex and not very precise.

It is an object of the present invention to provide a hitch device for attaching farm implements to a tractor, designed to eliminate the aforementioned drawbacks.

SUMMARY OF THE INVENTION

According to the present invention, there is provided a hitch device for attaching farm implements to a tractor, the device comprising two lift arms for supporting at least one farm implement; an actuating cylinder for each lift arm, the actuating cylinder having an output rod defining two chambers inside the actuating cylinder; and a circuit for feeding a fluid to and from said chambers; characterized in that said circuit comprises, for each said chamber, two feed lines for feeding said fluid to and from the chamber respectively, and also comprises four independent valves; each valve being located along one of said feed lines, and being movable between a closed position and at least one open position respectively closing and opening the relative said feed line.

BRIEF DESCRIPTION OF THE DRAWINGS

A non-limiting embodiment of the present invention will be described by way of example with reference to the accompanying drawings, in which:

FIG. 1 shows a schematic view in perspective of a preferred embodiment of the hitch device according to the present invention;

FIG. 3 shows a first variation of the FIG. 2 hydraulic circuit;

FIG. 4 shows a second variation of the FIG. 2 hydraulic circuit.

DETAILED DESCRIPTION OF THE INVENTION

Figure 2:
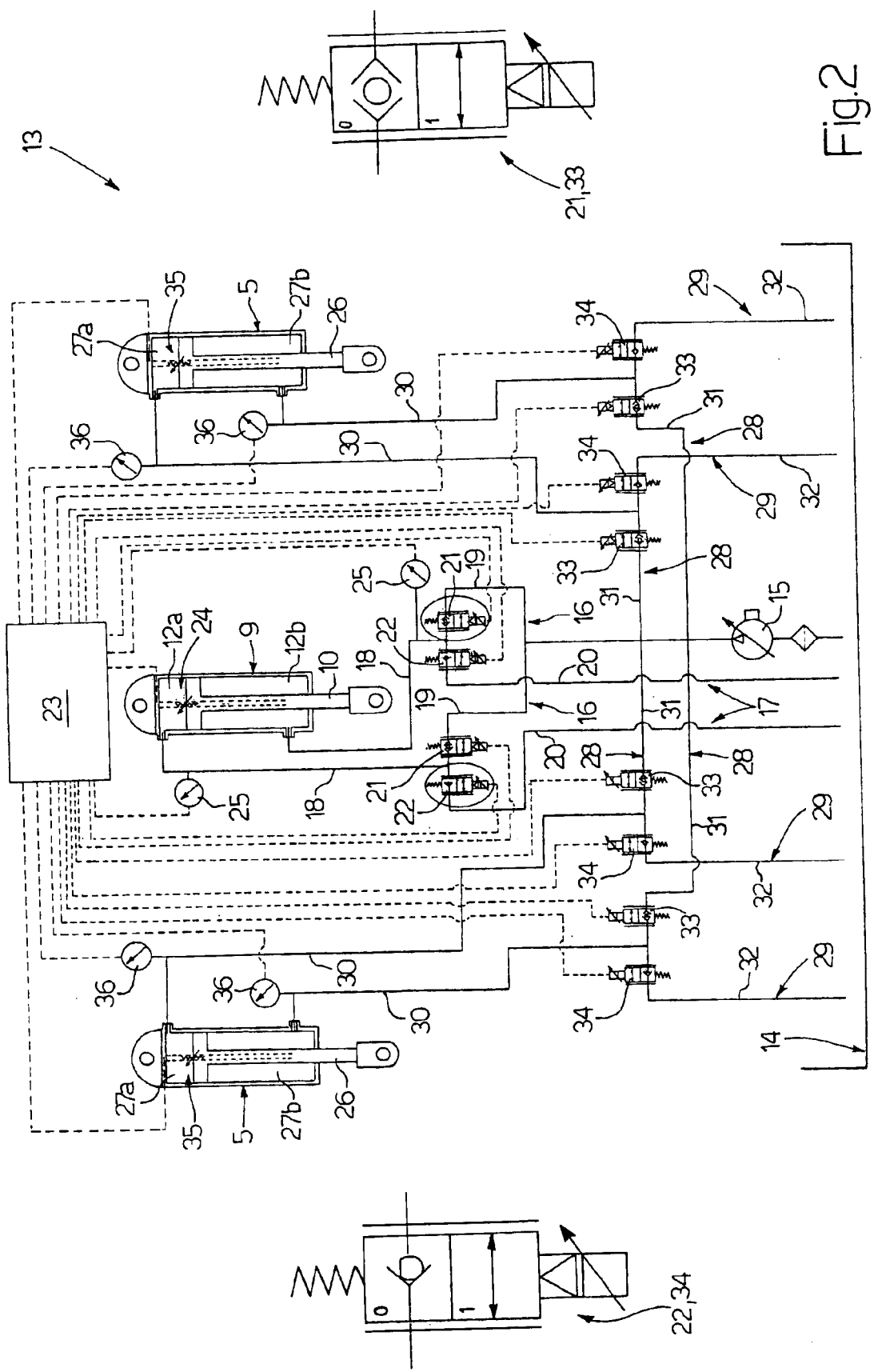
FIG. 2 shows schematically, with parts enlarged for clarity, a hydraulic circuit employed in the FIG. 1 hitch device.

Number 1 in FIG. 1 indicates as a whole a hitch device for attaching a known farm implement (not shown), such as a plough, to a tractor 2.

Device 1 is normally referred to as a "three-point hitch device", and comprises two bottom lift arms 3, which are connected in rotary manner to a frame 4 of tractor 2 by the interposition, for example, of a spherical joint (not shown), and are oscillated, with respect to frame 4 and by respective actuating cylinders 5, about respective substantially horizontal axes 6 of rotation (only one shown in FIG. 1).

The free end of each arm 3 has a supporting hook 7, which cooperates with hook 7 of the other arm 3 to support the implement (not shown), which is connected in rotary manner to hooks 7 to oscillate, with respect to hooks 7, about a hinge axis 8. The angular position of the implement (not shown) about axis 8 is controlled by a top actuating cylinder 9, which is connected in rotary manner to frame 4 by the interposition, for example, of a spherical joint (not shown), and comprises an output rod 10, the free end of which has a supporting hook 11 for engaging the implement (not shown).

With reference to FIG. 2, rod 10 defines, inside cylinder 9, two chambers 12, which communicate hydraulically with a hydraulic circuit 13 supplying pressurized fluid, and one of which (hereinafter indicated 12a) has a larger cross section than the other (hereinafter indicated 12b).

Circuit 13 comprises a fluid tank 14; a feed pump 15—in the example shown, a known piston pump—for drawing fluid from tank 14; and, for each chamber 12a, 12b, two feed lines 16, 17 for feeding fluid respectively to and from chamber 12a, 12b. Lines 16, 17 of each chamber 12a, 12b comprise a portion 18 common to both lines 16, 17 and connected hydraulically to relative chamber 12a, 12b; and two respective portions 19, 20, of which, portion 19 is a feed portion connected hydraulically to pump 15, and portion 20 a drain portion connected hydraulically to tank 14.

Each portion 19, 20 also communicates hydraulically with relative portion 18 by the interposition of a proportional electromagnetic valve 21, 22, which is movable, under the control of an electronic central control unit 23, between a closed position (hereinafter indicated "O") closing relative portion 19, 20, and an open position (hereinafter indicated "I") opening relative portion 19, 20.

In actual use, central control unit 23 selectively controls valves 21, 22 of cylinder 9 independently, so that:

When valves 21, 22 of chamber 12a are in the open "I" and closed "O" position respectively, and valves 21, 22 of chamber 12b are in the closed "O" and open "I" position respectively, chambers 12a, 12b communicate with pump 15 and tank 14 respectively, and rod 10 of cylinder 9 moves from a withdrawn position to an extracted position;

When valves 21, 22 of chamber 12a are in the closed "O" and open "I" position respectively, and valves 21, 22 of chamber 12b are in the open "I" and closed "O" position respectively, chambers 12a, 12b communicate with tank 14 and pump 15 respectively, and rod 10 of cylinder 9 moves from the extracted position to the withdrawn position; and When valves 21, 22 of chamber 12a are in the closed "O" and open "I" position respectively, and valves 21, 22 of chamber 12b are also in the closed "O" and open "I" position respectively, both chambers 12a, 12b communicate with tank 14, and rod 10 of cylinder 9 floats as determined by the farm implement (not shown).

Cylinder 9 also comprises a detecting device 24 connected to central control unit 23 and for controlling the position of rod 10 along cylinder 9; and two pressure transducers 25 also connected to central control unit 23 and for determining the pressure in respective chambers 12a, 12b and, therefore, the force exerted in use on rod 10.

In actual use, central control unit 23 selectively controls operation of all the valves 21, 22 of cylinder 9 as a function of the signals from device 24 and/or transducers 25, so as to operate cylinder 9 as follows:

When central control unit 23 only takes into account the signals from device 24, and excludes the signals from transducers 25, valves 21, 22 of cylinder 9 are operated to move rod 10 into, and then maintain, a given position stored in central control unit 23;

When central control unit 23 only takes into account the signals from transducers 25, and excludes the signals from device 24, valves 21, 22 of cylinder 9 are operated to move rod 10 so that the force exerted on rod 10 by the implement (not shown) is maintained substantially constant and equal to a given value; and When central control unit 23 takes into account the signals from both device 24 and transducers 25, valves 21, 22 of cylinder 9 are operated to move rod 10 within a given range of positions stored in central control unit 23, and to keep the force exerted on rod 10 by the implement (not shown) substantially constant and equal to a given value.

Each cylinder 5 is connected in rotary manner to frame 4 by the interposition, for example, of a spherical joint (not shown), and comprises an output rod 26 connected in articulated manner at the free end to relative arm 3, and which defines, inside cylinder 5, two chambers 27 communicating hydraulically with circuit 13, and one of which (hereinafter indicated 27a) has a larger cross section than the other (hereinafter indicated 27b).

For each chamber 27a, 27b of each cylinder 5, circuit 13 comprises two feed lines 28, 29 for feeding fluid respectively to and from chamber 27a, 27b. Lines 28, 29 of each chamber 27a, 27b comprise a portion 30 common to both lines 28, 29 and connected hydraulically to relative chamber 27a, 27b; and two respective portions 31, 32, of which, portion 31 is a feed portion connected hydraulically to pump 15, and portion 32 a drain portion connected hydraulically to tank 14.

Each portion 31, 32 also communicates hydraulically with relative portion 30 by the interposition of a proportional electromagnetic valve 33, 34, which is movable, under the control of central control unit 23, between a closed position (hereinafter indicated "O") closing relative portion 31, 32, and an open position (hereinafter indicated "I") opening relative portion 31, 32.

Each cylinder 5 also comprises a detecting device 35 connected to central control unit 23 and for controlling the position of rod 26 along cylinder 5; and two pressure transducers 36 also connected to central control unit 23 and for determining the pressure in respective chambers 27a, 27b and, therefore, the force exerted in use on rod 26.

Valves 33, 34 of each cylinder 5 operate in exactly the same way as described for valves 21, 22 of cylinder 9, and therefore require no further explanation.

In connection with the above, it should be pointed out that:

The implement (not shown) is lowered when rods 26 are moved simultaneously from the withdrawn to the extracted position;

The implement (not shown) is raised when rods 26 are moved simultaneously from the extracted to the withdrawn position;

The implement (not shown) is maintained in a given position when valves 33, 34 of cylinders 5 are all in the closed "O" position;

The implement (not shown) is moved about an axis of oscillation (not shown) substantially perpendicular to axis 8, when one of rods 26 is maintained in a given position and the other is moved between the withdrawn and extracted positions, and also when one of rods 26 is moved from the withdrawn to the extracted position, and the other from the extracted to the withdrawn position;

The implement (not shown) floats freely on the ground when valves 34 are all in the open "I" position, and valves 33 are all in the closed "O" position; and The angular position of the implement (not shown) about axis 8 is controlled selectively by operation of cylinder 9.

The FIG. 3 variation differs from FIG. 2 solely by piston pump 15 being replaced by a feed assembly 37 comprising a gear pump 38 for drawing fluid from tank 14; a drain line 39 for draining pump 38 into tank 14; and a compensating valve 40, which is located along line 39, is normally set to an open position opening line 39, and is moved by central control unit 23 into a closed position closing line 39 when fluid is to be fed by pump 38 to valves 21 and/or 33.

The FIG. 4 variation differs from FIGS. 2 and 3 solely by piston pump 15 and feed assembly 37 being replaced by a feed assembly 41 comprising a piston pump 42 for drawing fluid from tank 14; a gear pump 43 also for drawing fluid from tank 14; a drain line 44 for draining pump 43 into tank 14; and a connecting line 45 connecting pumps 42 and 43.

Assembly 41 also comprises a compensating valve 46 located along line 45 and normally set to a closed position closing line 45; and a drain valve 47 located along line 44 and normally set to an open position opening line 44. In actual use, when fluid is to be fed by pump 42 to valves 21 and/or 33, central control unit 23 moves valve 46 into an open position opening line 45, so that pump 43 supplies fluid to pump 42, and valve 47 is moved into a closed position closing line 44.

Pressure transducers 36 therefore provide for directly controlling the forces exerted, in use, on hitch device 1, with no need for additional control devices specially designed for the purpose. In which connection, it should be pointed out that pressure transducers 25 are auxiliary with respect to pressure transducers 36.

What is claimed is:

1. A hitch device for attaching farm implements to a tractor, the device comprising two lift arms for supporting at least one farm implement; an actuating cylinder for each lift arm, the actuating cylinder having an output rod defining two chambers inside the actuating cylinder; and a circuit for feeding a fluid to and from said chambers; wherein said circuit comprises, for each said chamber, a feed line for feeding said fluid to the chamber and a feed line for removing said fluid from the chamber, respectively, and also comprises four independent valves; each valve being located along one of said feed lines, and being movable between a closed position and at least one open position respectively closing and opening the relative said feed line, wherein each said valve is a proportional electromagnetic valve, and wherein said actuating cylinder has a first detecting device for detecting a fluid pressure inside each of said chambers to determine a force exerted, in use, on said output rod; electronic control means being provided to selectively control said valves as a function of a signal from said first detecting device.

2. The device as described in claim 1, wherein said actuating cylinder has a second detecting device for detecting a position of said output rod along the actuating cylinder; electronic control means being provided to selectively control said valves as a function of a signal from said second detecting device.

3. The device as described in claim 2, wherein said actuating cylinder has a first detecting device for detecting a fluid pressure inside each of said chambers to determine a force exerted, in use, on said output rod; and a second detecting device for detecting a position of said output rod along the actuating cylinder; electronic control means being provided to selectively control said valves as a function of a signal from said first and/or second detecting device.

4. The device as described in claim 3, wherein said farm implement is connected in rotary manner to said lift arms to oscillate about a given hinge axis; a further actuating cylinder being interposed between the tractor and the farm implement to selectively control an angular position of the farm implement about said hinge axis.

5. The device as described in claim 4, wherein said further actuating cylinder comprises a further output rod defining two further chambers inside the further actuating cylinder; said circuit also comprising two further feed lines for feeding said fluid to and from each said further chamber respectively, and four independent further valves, each located along one of said further feed lines and movable between a closed position and at least one open position respectively closing and opening the relative said further feed line.

6. The device as described in claim 5, wherein each said further valve is a proportional electromagnetic valve.

7. The device as described in claim 6, wherein said further actuating cylinder has a third detecting device for detecting a fluid pressure inside each of said further chambers to determine a force exerted, in use, on said further output rod; electronic control means being provided to selectively control said further valves, as a function of a signal from said third detecting device.

8. The device as described in claim 7, wherein said further actuating cylinder has a fourth detecting device for detecting a position of said further output rod along the further actuating cylinder; electronic control means being provided to selectively control said further valves as a function of a signal from said fourth detecting device.

9. The device as described in claim 8, wherein said further actuating cylinder has a third detecting device for detecting a fluid pressure inside each of said further chambers to determine a force exerted, in use, on said further output rod; and a fourth detecting device for detecting a position of said further output rod along the further actuating cylinder; electronic control means being provided to selectively control said further valves as a function of a signal from said third and/or said fourth detecting device.

10. The device as described in claim 9, wherein said circuit comprises a piston pump.

11. The device as described in claim 10, wherein said circuit comprises a feed assembly, in turn comprising a tank for said fluid; a gear pump for drawing fluid from said tank; a drain line for draining the gear pump into the tank; and a compensating valve located along said drain line and movable between an open position and a closed position respectively opening and closing the drain line.

12. The device as described in claim 11, wherein said circuit comprises a feed assembly, in turn comprising a tank for said fluid; a piston pump and a gear pump for drawing fluid from said tank; a drain line for draining the gear pump into the tank; a drain valve located along said drain line and movable between an open position and a closed position respectively opening and closing the drain line; a connecting line connecting said piston pump and said gear pump; and a compensating valve located along said connecting line and movable between an open position and a closed position respectively opening and closing the connecting line.

\* \* \* \* \*